Oct. 4, 1966  R. F. SHANNON  3,276,094
TRANSFER PALLET CONSTRUCTION
Filed March 19, 1964  2 Sheets-Sheet 1

INVENTOR.
RICHARD F SHANNON
BY
ATTORNEYS

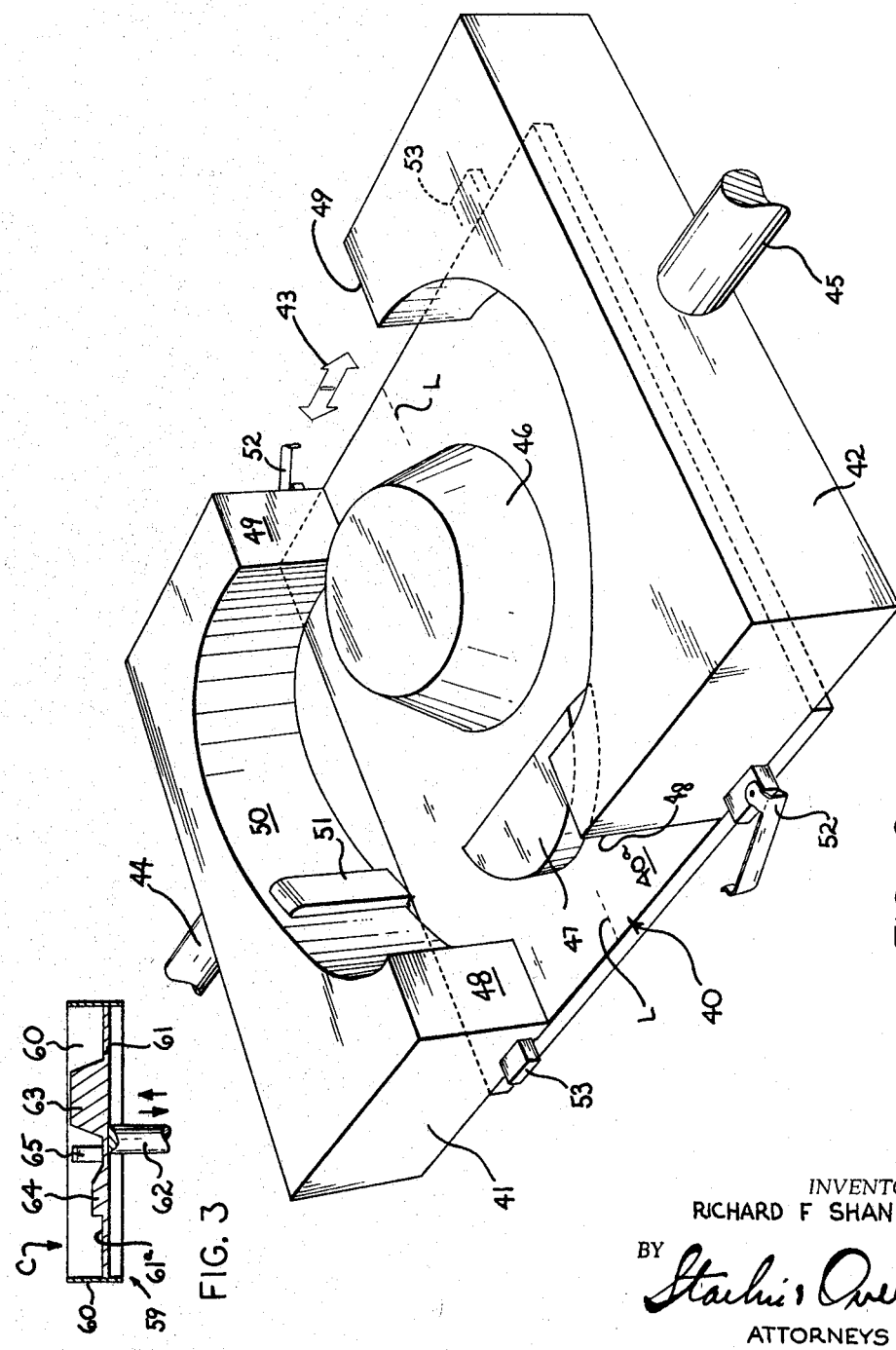

United States Patent Office 3,276,094
Patented Oct. 4, 1966

1

3,276,094
TRANSFER PALLET CONSTRUCTION
Richard F. Shannon, Lancaster, Ohio, assignor to Owens-Corning Fiberglas Corporation, a corporation of Delaware
Filed Mar. 19, 1964, Ser. No. 353,039
7 Claims. (Cl. 25—153)

The present invention relates to an article of manufacture in the nature of a pallet or support member for transferring formed ceramic materials during hardening, drying and maturing steps in the manufacturing process. More particularly, the present invention relates to a novelly designed pallet which, in part by reason of novel features of design and in part by reason of its composition, is uniquely adapted to endure repeated exposure to such heating cycles without thermal degradation or material physical deterioration.

Ceramics and other porcelain wares are formed of clay-like (aluminum silicate) mixtures which are cast or molded in the wet or moist condition. They are formed into a variety of shapes and contours. Familiar, for example, are the sanitary ware such as sinks, basins, bowls, bathtubs, toilet bowls and the like. It is, of course, desirable that such ware, which term will be used generically herein to cover and include all ceramics, e.g., clay-like articles, be ultimately converted to a hard, glazed surface, devoid of imperfections. Conventionally, such ceramic ware is conducted through a heat drying cycle while supported on support trays or pallets formed historically of a variety of materials, e.g., wood, metal, gypsum, etc. Unfortunately, most materials employed heretofore are of relatively short life due to the deterioration experienced on repeated exposure to the drying cycles which involve relatively elevated temperatures in the range of from 100–250° F.

It is furthermore found that certain of the materials, e.g., metal, of which these pallets or trays have been formed, are quite heavy whereby they present a problem of handling to the workmen. Additionally, the metal pallet is inherently possessed of a high thermal expansion coefficient which can have adverse effects on the moist ceramic ware supported thereon. Many of the materials used heretofore are also known to be relatively fragile. Exemplary are pallets (or trays) formed of a gypsum material extended with perlite (glass-like volcanic by-product in the form of hollow bubbles). Gypsum has a density of about 65 pounds per cubic foot, is quite fragile and subject to considerable degradation upon exposure to as few as 3 to 5 successive exposures to the heat cycles involved, e.g., 100–250° F.

It is also a shortcoming of some presently used materials, e.g., metal, used as pallet or support trays, that they do not readily absorb water as it is driven off of the moist ceramic during the heating cycle. As a consequence, a longer drying cycle must be employed, otherwise the contact area between the ceramic ware and the pallet or support tray surface does not completely dry out, whereupon any movement causes a smearing, which, when drying is completed, shows up as a surface imperfection.

It is desirable that the pallet involved for the drying of ceramic ware be dimensionally stable under the conditions of use since any expansion and or contraction will effect the dimensions of the ware carried thereon, leading to a high proportion of "rejects."

In the light of the foregoing introduction, it may be stated that it is a general object of the present invention to provide a pallet construction which is generally avoidative of the various difficulties, shortcomings and problems enumerated hereinabove.

It is a particular object of the present invention to provide a pallet or transfer member construction which embodies strength, light weight, moisture absorptive properties, dimensional stability and relative imperviousness to heat up to 1800° F.

It is a specific object of the present invention to provide a pallet construction embodying light weight coupled with structural integrity even after repeated exposures to the elevated temperatures concerned.

It is likewise an object of the present invention to provide a pallet as herein described which can be easily fabricated to a variety of desired contours, usually and preferably by molding.

It is additionally an object of the present invention to provide a tray-like pallet construction as herein described which embodies an extremely smooth surface which does not detract from the smoothness of surface inherent in the ceramic ware castings as produced.

It is still another object of the present invention to provide a tray or pallet construction of the type herein described which possesses an inherent surface hardness coupled with the above-described smoothness, whereby accidental contact with the tray or pallet surface will not destroy the contour thereof.

The pallet or tray construction in accordance with the present invention is fabricated (usually by gravity casting) of an inorganic material, preferably a silicate, as hereinafter more particularly described. Ideally, the pallet has integrally secured thereto a peripheral band tightly encircling the tray whereby the pallet or tray is placed under definite and vigorous compression forces in the plane of greatest area, thereby enhancing the resistance of the assembly to breakage. A further and very important advantage attendant the employment of the peripheral band resides in the fact that, even if the planar body becomes cracked or even broken, the propagation of the cracks is reduced and the structural unity is preserved, such that the pallet can still be used.

The foregoing objects and a clearer understanding of the invention herein concerned will become apparent to those skilled in the art from the following detailed description taken in conjunction with the annexed sheets of drawings on which there is presented, for purposes of illustration only, a single embodiment of the present invention together with two techniques which may be employed to fabricate same.

In the drawings:

FIG. 2 is a perspective view of a three-piece mold structure assembly (shown in the open position) which may be utilized under certain circumstances to form the pallet shown in FIG. 1.

FIG. 3 is a side elevation sectional view of a two-piece mold construction which may be utilized in gravity casting a silicate slurry to form the pallet or tray construction shown in FIG. 1.

Figure 1:
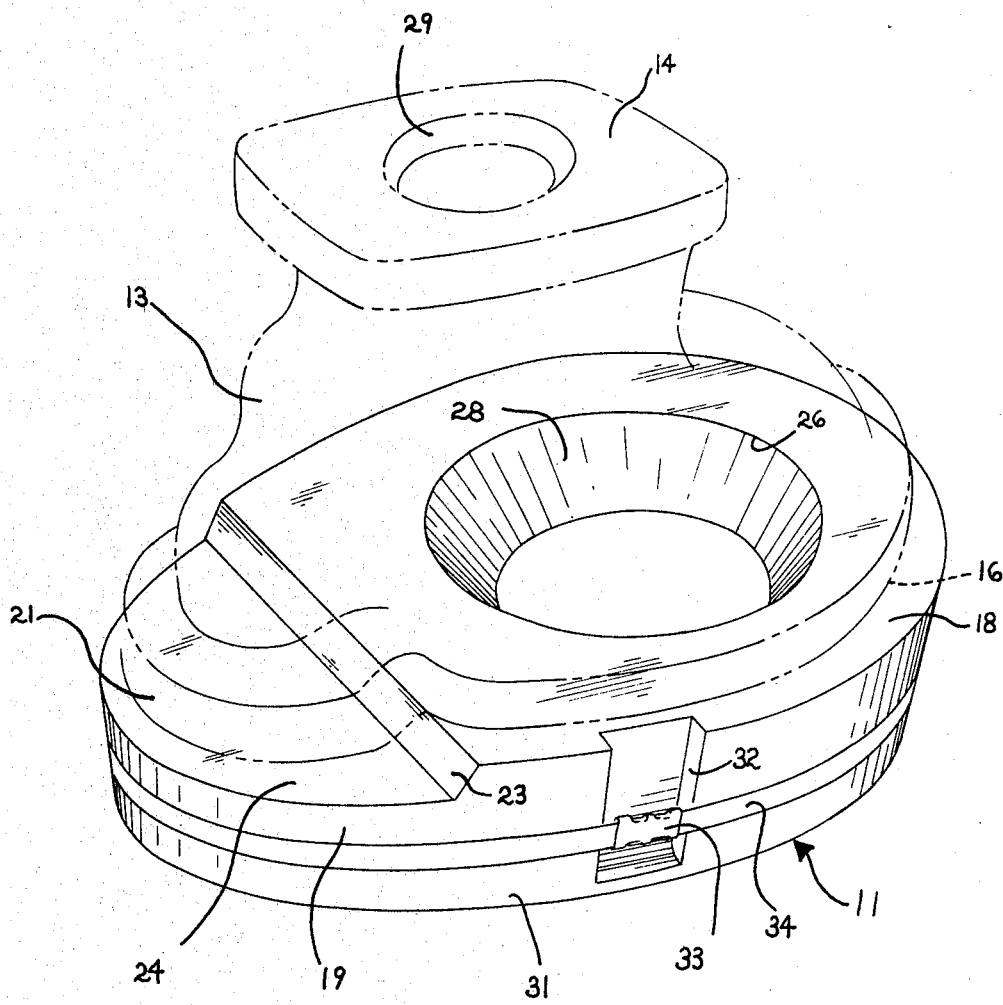
FIG. 1 is a perspective view of a particular pallet or tray construction (shown in dotted outline) bearing a porcelain toilet bowl in supporting relationship; the bowl being shown in dotted outline.

In its most simple embodiment, the present invention contemplates a pallet construction comprising a planar body formed of a silicate crystalline material; the body having a flat smooth upper surface and the planar body having a restraining or compression band peripherally encircling same to hold it in a definite state of compression. The pallet or transfer tray of the present invention is a porous yet solid light weight silicate, which composition will be described with more particularity hereinafter. In one embodiment, the tray takes the form of a planar annular member 11 of generally oval contour as viewed in FIG. 1. As shown in FIG. 1, the tray or pallet supports a toilet bowl 13 shown in inverted dotted outline with its base 14 facing upwardly and its upper surface 16 bearing on a smooth flat upper surface 18 of the pallet 11. The pallet 11 for the toilet bowl includes a reduced thickness portion 19 at one end to accommodate an off set toilet seat attaching portion 21 of the toilet bowl 13. The end 19 is separated from the main body portion by a shoulder 23 which extends from the surface 18 to the upwardly facing smooth surface 24 of the end portion 19. The pallet 11 includes a hole 26 having an inwardly tapered wall 28 (and downwardly) which registers with the opening or interior of the toilet bowl which ultimately terminates at the base portion at the hole 29. The hole 26, of course, obviously provides a better circulation of the drying air in the course of the pallet 11 and the ware 13 through the drying cycle. The pallet 11 is defined by an annular vertical side wall 31. The latter and the contiguous portion of the upper surface 18 is provided with a vertical cutout 32 which provides removal space for a clinching tool utilized to engage a clamp 33 or clip which securely fastens together the ends of a steel band or tape 34 which encircles the pallet 11 and is in peripheral surface to surface contact with the annular side wall 31.

The pallet construction in accordance with the present invention is preferably formed by a gravity casting of a slurry of hydrous silicate forming materials utilizing, for example, a mold arrangement as shown in either of FIG. 2 or 3. The molding apparatus for the silicate slurry shown in FIG. 2 is composed of three principal pieces; namely, a bottom plate 40, a mold half 41 and a mold half 42; the mold halves being shown in the open position in FIG. 2 and in reciprocating relationship on top of the upper surface 40a of the plate member 40. Reciprocation occurs in the direction of the arrow 43 as controlled by suitable movement of the mold halves 41 and 42 by the control arms 44 and 45, respectively. The bottom plate 40 possesses a smooth and polished upper surface 40a and also includes a central projection 46 in the form of a truncated cone member which is definitive of the hole 26 in the ultimate pallet. Additionally, the plate 40 includes an integral upstanding semi-circular shaped projection 47 which defines the reduced height end portion 19 of the pallet 11 as viewed in FIG. 1. The mold halves 41 and 42 are reciprocatingly movable into contacting relationship between the opposed surfaces 48 and 49 of the mold halves which meet at the dotted line L to define an annular cavity receptive of the slurry ingredients. The mold half 41 includes on the inner side wall 50 a rectangular integral projecting member 51 which forms the rectangular cutaway portion 32 in the ultimate pallet construction. Pivotable clamps 52 on the mold halves engage a locking bar 53 on the opposite mold half to hold them together. After the slurry has been formed or poured and allowed to harden in the manner as described hereinafter, it may be easily disassembled and the resultant dry pallet removed and thereafter combined with the encircling compression imparting band 34 as shown in FIG. 1.

FIG. 3 discloses a slightly variant form of gravity casting apparatus 59 composed principally of a continuous annular side wall 60 into which fits a bottom plate 61 affixed to a push rod 62 suitably controlled to move in the direction of the arrows. The bottom plate 61 includes the truncated cone-like projection 63 and a rectangular projection 64 which function in the same manner as the member 46 and the member 47 in the apparatus shown in FIG. 2. Similarly, the annular side wall 60 bears a rectangular projection 65 which serves the same function as the member 51 on the mold half 50 in the apparatus shown in FIG. 2. In this apparatus the viscous slurry is poured in the cavity C defined by the upper surface 61a of the plate 61 and the annular side wall 60, whereupon after hardening the bar 62 may be activated to push the plate 61 upwardly together with the hardened pallet beyond the confines of the annular wall 60 whereupon it may be easily removed from the plate 61. The foregoing description is considerably detailed in order to clearly and particularly disclose a molding apparatus suited for forming one embodiment of pallet construction. It will be appreciated, however, that pallet constructions for other porcelain and ceramic ware bodies will require slightly different shapes and/or contours, the fabrication of which can be accomplished by employment of techniques and principles inherent in the specific gravity casting apparatus and method as disclosed hereinabove.

A pallet body of the construction in accordance with the present invention, considered in the broadest sense, may be formed of a variety of materials which can be fabricated, preferably by molding, into planar configuration and then banded with a peripheral compression band as described herein. The materials are preferably porous or absorbent in character and also preferably refractory to heating temperatures as well as crystalline. Relative light weight is also quite desirable from the standpoint of handling by production workers. Gypsum, magnesia, light weight cement and cementitious aggregate of various kinds including materials marketed under the trade name "Transite" are broadly speaking of utility as pallet formers and, when banded peripherally, fall within the purview of the present invention. Having in mind the optimum combination of properties desirably possessed by a pallet in accordance with this invention, it is most preferred for the pallet body to be formed of a hydrous calcium silicate having a porous crystalline integrated structure. As indicated hereinabove, these silicate materials are formed from a slurry. The slurry is composed of an aqueous mixture of lime and silica and usually in addition an amount of fibrous asbestos to provide reinforcement and inhibition against settling of the particles of silica. The lime and silica reactants and other inert ingredients of the slurry are thereafter exposed to a saturated steam atmosphere and above atmospheric pressure (frequently referred to as induration) for a time to cause reaction and conversion of the lime and silica into an intermediate calcium silicate hydrate which converts ultimately to the formation of tobermorite ($4CaO \cdot 5SiO_2 \cdot 5H_2O$) and ultimately to crystalline xonotlite having the formula $$5CaO \cdot 5SiO_2 \cdot H_2O$$

Depending upon the relative amounts of the lime and silica and the time, temperature and pressure of the induration step, the resulting crystalline network may be composed of varying proportions of tobermorite and xonotlite as desired for the specific application.

Generally, the ratio of lime and silica in the slurry is usually adjusted to fall within the range of 0.65 mol of lime (CaO) to 1.0 mol of silica ($SiO_2$). This ratio will tend to insure production of a crystalline integrated form of calcium silicate useful in the formation of a heat resistant, moisture absorbent, dimensionally stable pallet construction. Most desirably, if integrity is desired in the range of temperatures up to 1000° F., the lime and silica proportion within the slurry is adjusted to constitute in the neighborhood of 4:5 to 5:5 (lime/silica) while, at the same time, the water component of the slurry is maintained in an initial saturated condition with respect to the lime and is so maintained, whereby the product involves a continuous dissolution of the lime and a continuous reaction thereof with the silica component to yield an initial product having the formula $2CaO \cdot SiO_2 NH_2O$ which converts through a sequence of reactive hydrous silicates of lime to the formation of tobermorite $$(4CaO \cdot 5SiO_2 \cdot 5H_2O)$$

The latter under the temperature of saturated steam pressure conditions (induration conditions) finally converts to xonotlite having the formula indicated hereinabove.

The structure of the xonotlite integrated crystalline structure is open and porous. The product is strong and resilient while, at the same time, refractory to high temperatures in the range of 1500–1800° F. The xonotlite structure is eminently dimensionally stable at high temperatures and is chemically inert.

The slurry of ingredients additionally includes an amount of water selected to yield a product of the desired density. Broadly speaking, the pallet construction body formed of hydrous calcium silicate may vary from 7 to 50 pounds per cubic foot. As indicated, this is done by adjusting the water to solids ratio, wherein the solids constitute the sum of the amounts of silica, lime, asbestos, miscellaneous filler and the like. The water/solids ratio of 3 to 1 will yield a product of approximately 21 pounds per cubic foot density, while a ratio of water to solids of 1 to 1 yields a product of about 50 pounds per cubic foot. The ratio of 9 to 1 (water/solids) yields a low density product in the neighborhood of 7 pounds per cubic foot. The slurry desirably includes asbestos, usually of a fibrous type, since this may then function as a suspending agent preventing the settling of the solids of lime and silica, thereby maintaining a proper dispersion until a gravity inhibiting prehardening has been effected upon exposure to heat. Secondarily, the asbestos fibers dispersed throughout the mass are of benefit in providing a reinforcement function lending structural integrity to the ultimately formed mass.

The slurry as described above can, of course, be poured into a molding apparatus as shown in either FIG. 2 or FIG. 3 and thereafter subjected to indurating conditions involving elevated temperatures and elevated pressures with contemporaneous saturated steam conditions. The induration involving saturated steam conditions effects a gradual removal of water without shrinkage as would be attendant too fast a drying of the product. The latter is also desirably effected by maintaining a pressure on the product. An autoclave is an ideal apparatus to be used in effecting the conversion of the slurry to the intermediate gelatinous phases and thence to the formation of tobermorite, xonotlite and mixtures thereof, depending upon the ratio of reactants and particular indurating conditions utilized.

The pallets in accordance with this invention are fabricated, usually by gravity casting, to a thickness just sufficient to embody integrity and strength sufficient for supporting the items to be dried. The thickness maintained is generally as small as possible in order that the weight will be kept within a range lending ready handling by production workers. Where the hydrous calcium silicate materials are utilized, it has been found that a pallet thickness of 2 to 3 inches is sufficient to support the ceramic ware products, e.g., bowls, sinks, etc. These pallets generally vary from 200 to 600 square inches in planar area in order to accommodate these generally large components. The peripheral band, of course, permits the thickness to be held down to the 2- to 3-inch figure. These preferred pallet constructions, as described, have an almost infinite life expectancy due to the structural integrity achieved by the combination of the choice of the preferred hydrous calcium silicate body and the peripheral banding and due to the thermal and chemical inertness of the silicate body.

A particularly desirable feature of the hydrous calcium silicate materials as pallet components resides in their capability to readily absorb water or moisture from the ceramic ware resting thereon, whereby very even drying occurs.

The following example illustrates a preferred formulation of a slurry utilized in forming the body of the pallet construction.

EXAMPLE I

The following ingredients listed in Table 1 are combined in a large mixer-blender.

Table 1

| Ingredients: | Parts by weight |
|---|---|
| Tripoli (99% $SiO_2$) | 1,000 |
| Lime (94% CaO) | 1,000 |
| Asbestos (fibrous chrysotile) | 800 |
| Water | 14,000 |

The slurry is mixed to insure efficient distribution of the ingredients and the slurry is found to be fairly viscous, having a consistency of cream. The slurry is then poured into a molding apparatus, such as illustrated in FIGS. 2 or 3, and this assembly is introduced into an autoclave wherein the conditions within are adjusted to a temperature of 203° C. (397° F.) and a pressure therewithin of 250 pounds per square inch gauge. These conditions are maintained during the "induration cycle" of about 3–4 hours whereupon the ingredients react and proceed through the stages indicated hereinabove to ultimately yield an integrated crystalline network of crystals identified as xonotlite having the structural formula $5CaO \cdot 5SiO_2 \cdot H_2O$. The product upon removal from the apparatus is determined to have a density of 12 pounds per cubic foot. The product is structurally sound and is refractory to temperatures well in excess of 1000° F. approaching 1800° F. The body of the pallet is possessed of voids which exceed in aggregate volume that of the crystals.

The pallet, formed in accordance with the slurry formulation described in Example I and utilizing a molding method as described in apparatus such as FIGS. 2 or 3, is thence assembled into an ultimate desired pallet in accordance with the present invention by encircling same with a steel band and clamping same in an expeditious manner as provided by the cutout permitting removal of the clamping tool in the manner hereinabove described.

Most preferably, the surface of the pallet which was in contact with the polished surface of the mold and which, as formed, was the bottom surface of the silicate body, is coated to improve the surface hardness. One very desirable coating is accomplished by either spraying or dipping the pallet in a sodium silicate solution. A number of these are commercially available, e.g., "N" brand manufactured by Philadelphia Quartz and Grades 33 and 40 manufactured by Diamond Alkali Company. Grade N involves a $SiO_2/Na_2O$ ratio of 3.22/1. In practice is is usually desirable to employ a 5 to 10% by weight solids solution and to apply it such that the coating penetrates to a depth of from $\frac{1}{16}$ to $\frac{3}{16}$ inch. This involves a weight pickup of the sodium silicate ranging from 4 grams to 12 grams per square foot of surface area. A minimum of 3 grams per square foot will lend improvement, while a maximum of 25 can be tolerated. Most preferably, a range of 3 to 15 gives the desired hardness without any decrease in water absorption. The sodium silicate coating enhances the surface smoothness and hardness without materially affecting the ability of the pallet body to absorb moisture. The coating additionally enhances the sanding of the pallet to remove surface imperfections. In the absence of the coating it is found that, upon sanding, the fibers in the pallet body become rough, detracting from smoothness of the surface. The coating, on the other hand, embrittles the asbestos fibers whereby they break off during the sanding operation, yielding a smooth, clean surface. While the inorganic coatings represented by sodium silicate and colloidal silica (such as Du Pont's "Ludox") are preferred coatings for the pallet body, a number of organic coatings can and have been used in applications, not exceeding the thermal capabilities of the particular resin. Thus, an A-stage water soluble phenolic resin has been used. Urea formaldehyde and melamine formaldehyde resins, such as "Urac 180" and "Melmac 405" marketed by American Cyanamid, have also been used for coatings of the pallet body, aiding in producing a smooth, hard, sandable surface. Water soluble polyesters likewise have been used as well as "Rhoplex" acrylics; the latter marketed by Rohm and Haas (Philadelphia, Pennsylvania). The organics, preferably thermosetting organic coating resins, where used, must be selected from those which do not embody a softening temperature in the range of the temperature of the drying, curing, maturing or heating cycle of the ceramic ware being borne by the pallet construction of the present invention. The organic should be carefully selected in order that the moisture absorptive character of the porous pallet body is not destroyed.

The foregoing description constitutes a disclosure of the pallet constructions constituting the subject matter of the present invention with particularity as to enable others to practice and duplicate my invention while, at the same time, it will enable certain of those skilled in the art to make obvious and expected changes and modifications which should, of course, be included within the spirit and scope of the present invention unless specifically delimited by the appended claims which set forth the "metes and bounds" of the present invention.

I claim:
1. A pallet for supporting ceramic ware during heat drying of the ware, said pallet comprising:
   a generally flat planar member formed of a hydrous calcium silicate material, said planar member having an upwardly facing surface for supporting contact with the ceramic ware and a peripheral side wall, and
   a restraining band peripherally encircling said member in contact with said side wall for holding said member in compression, thereby increasing the resistance to breakage due to accidental physical impact.
2. A pallet as claimed in claim 1 where said material has:
   (1) a density less than 50 pounds per cubic foot,
   (2) structural integrity and dimensional stability even after prolonged exposure to elevated temperatures of from 100° F. to 1800° F., and
   (3) water absorptivity.
3. A pallet as claimed in claim 1 wherein said material consists essentially of pure, synthesized crystals of tobermorite which are continuously integrated with each other without any other bonding medium and forming a three-dimensional network interspersed with voids, the aggregate volume of the voids being in excess of that of the crystals.
4. A pallet as claimed in claim 1 wherein said material consists essentially of pure synthesized crystals of tobermorite and xonotlite, said crystals being continuously integrated with each other without any other bonding medium, said crystals forming a three-dimensional network interspersed with voids and said upper surface bears a coating imparting greater surface hardness.
5. A pallet as claimed in claim 1 wherein said upper surface is impregnated with a coating selected to provide surface smoothness and hardness without detracting from inherent absorbency of the said silicate.
6. A pallet as claimed in claim 5, wherein said coating is a sodium silicate solution.
7. A pallet as claimed in claim 5, wherein said coating is colloidal silica.

References Cited by the Examiner

UNITED STATES PATENTS

| | | | |
|---|---|---|---|
| 1,746,902 | 2/1930 | Persons | 248—346.1 |
| 2,063,268 | 12/1936 | Plunkett | 117—169 |
| 2,288,633 | 7/1942 | Luckhaupt | 117—123 |
| 2,552,640 | 5/1951 | Morin | 25—153 |
| 3,099,063 | 7/1963 | Santhany | 25—153 |

FOREIGN PATENTS 781,698   8/1957   Great Britain.

OTHER REFERENCES

"The Chemistry of Cement and Concrete," St. Martin's Press, 1956, London; pp. 176–183.

J. SPENCER OVERHOLSER, *Primary Examiner.*

G. A. KAP, R. D. BALDWIN, *Assistant Examiners.*